(12) United States Patent
Morino et al.

(10) Patent No.: US 12,297,859 B2
(45) Date of Patent: May 13, 2025

(54) ELECTRONIC APPARATUS

(71) Applicant: Lenovo (Singapore) Pte. Ltd., Singapore (SG)

(72) Inventors: Takayuki Morino, Kanagawa (JP); Yalu Liu, Kanagawa (JP); Tabito Miyamoto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 82 days.

(21) Appl. No.: 18/170,892

(22) Filed: Feb. 17, 2023

(65) Prior Publication Data
US 2023/0287929 A1    Sep. 14, 2023

(30) Foreign Application Priority Data

Mar. 11, 2022   (JP) .................................. 2022-038240

(51) Int. Cl.
*G06F 1/16* (2006.01)
*F16C 11/04* (2006.01)

(52) U.S. Cl.
CPC .................................. *F16C 11/04* (2013.01)

(58) Field of Classification Search
CPC .... G06F 1/1613; G06F 1/1616; G06F 1/1652; G06F 1/1681
See application file for complete search history.

(56) References Cited

U.S. PATENT DOCUMENTS

| | | | |
|---|---|---|---|
| 2021/0307186 A1* | 9/2021 | Hong | H04M 1/0216 |
| 2022/0104370 A1* | 3/2022 | Wu | H05K 5/0017 |
| 2023/0229203 A1* | 7/2023 | Hsiang | G06F 1/1624 |
| | | | 361/679.27 |
| 2024/0219967 A1* | 7/2024 | Wang | G06F 1/1652 |

FOREIGN PATENT DOCUMENTS

| | | |
|---|---|---|
| JP | 2012190491 A | 10/2012 |
| JP | 6453413 B1 | 1/2019 |
| JP | 2020053001 A | 4/2020 |
| JP | 2021102979 A | 7/2021 |

* cited by examiner

*Primary Examiner* — Anthony Q Edwards
(74) *Attorney, Agent, or Firm* — Osha Bergman Watanabe & Burton LLP

(57) ABSTRACT

An electronic apparatus includes: a first chassis; a second chassis which is adjacent to the first chassis; a hinge device which so connects the first chassis and the second chassis as to be rotationally movable relative to each other between a first posture that the first chassis and the second chassis are so folded as to mutually overlap in a surface normal direction and a second posture that the first chassis and the second chassis are mutually arrayed in a direction which is vertical to the surface normal direction; and a display which is so installed as to range from the first chassis to the second chassis and has a folding region which is folded in accordance with relative rotational movement of the first chassis and the second chassis.

6 Claims, 6 Drawing Sheets

ELECTRONIC APPARATUS

CROSS-REFERENCE TO RELATED APPLICATIONS

This application claims priority to Japanese Patent Application No. 2022-038240 filed on Mar. 11, 2022, the contents of which are hereby incorporated herein by reference in its entirety.

BACKGROUND

Technical Field

The present invention relates to an electronic apparatus that a plurality of chassis is connected by a hinge device.

Description of Related Art

In recent years, the use of an electronic apparatus such as a PC (personal computer), a smartphone and so forth of the type of having a touch-panel-system liquid crystal display and not having a physical keyboard is rapidly spreading. It is desirable that the display of the electronic apparatus of the above-mentioned type is large when used and, on the other hand, it is also desired that the display is made compact when not used. Accordingly, an electronic apparatus which is configured that not only a chassis but also the display is made foldable by using a flexible display such as an organic EL (Electro Luminescence) display and so forth is proposed (see Japanese Patent No. 6453413).

The flexible display is requested to withstand repetitively performed folding operations. Accordingly, the electronic apparatus is requested to have a configuration of making it possible to fold the display with a desirable radius of curvature. In addition, the flexible display is very thin and, therefore, is vulnerable when exposed to shock and so forth. Accordingly, a rear face of the flexible display is requested to be supported with no level difference and with a high flatness.

SUMMARY

The present invention has been made for consideration of drawbacks of the above-described prior art and aims to provide an electronic apparatus which makes it possible to stably support a display which is in a folded state.

According to one aspect of the present invention, there is provided the electronic apparatus including a first chassis, a second chassis which is adjacent to the first chassis, a hinge device which so connects the first chassis and the second chassis as to be rotationally movable relative to each other between a first posture that the first chassis and the second chassis are so folded as to mutually overlap in a surface normal direction and a second posture that the first chassis and the second chassis are mutually arrayed in a direction which is vertical to the surface normal direction and a display which is so installed as to range from the first chassis to the second chassis and has a folding region which is folded in accordance with relative rotational movement of the first chassis and the second chassis, in which the hinge device has a hinge main body which extends along mutually adjacent ends of the first chassis and the second chassis, is so arranged as to stride over the mutually adjacent ends and supports a rear face of the display with its front face, a first support plate which is adjacent to a first edge of the hinge main body which is located on the first chassis side, is installed to be movable relative to the first edge and supports the rear face of the display with its front face and a second support plate which is adjacent to a second edge of the hinge main body which is located on the second chassis side, is installed to be movable relative to the second edge and supports the rear face of the display with its front face, the hinge main body has a first locking strip which protrudes toward the first support plate side and is locked on the rear face side of the first support plate at the time of taking the second posture and a second locking strip which protrudes toward the second support plate side and is locked on the rear face side of the second support plate at the time of taking the second posture, the first support plate has a first plate-side locking strip which protrudes toward the hinge main body side and is locked on the rear face side of the hinge main body at the time of taking the second posture, and the second support plate has a second plate-side locking strip which protrudes toward the hinge main body side and is locked on the rear face side of the hinge main body at the time of taking the second posture.

According to the above-described aspect of the present invention, it becomes possible to stably support the display which is in the folded state.

DETAILED DESCRIPTION

In the following, an electronic apparatus pertaining to the present invention will be described in detail by giving a preferred embodiment, while referring to the appended drawings.

Figure 1:
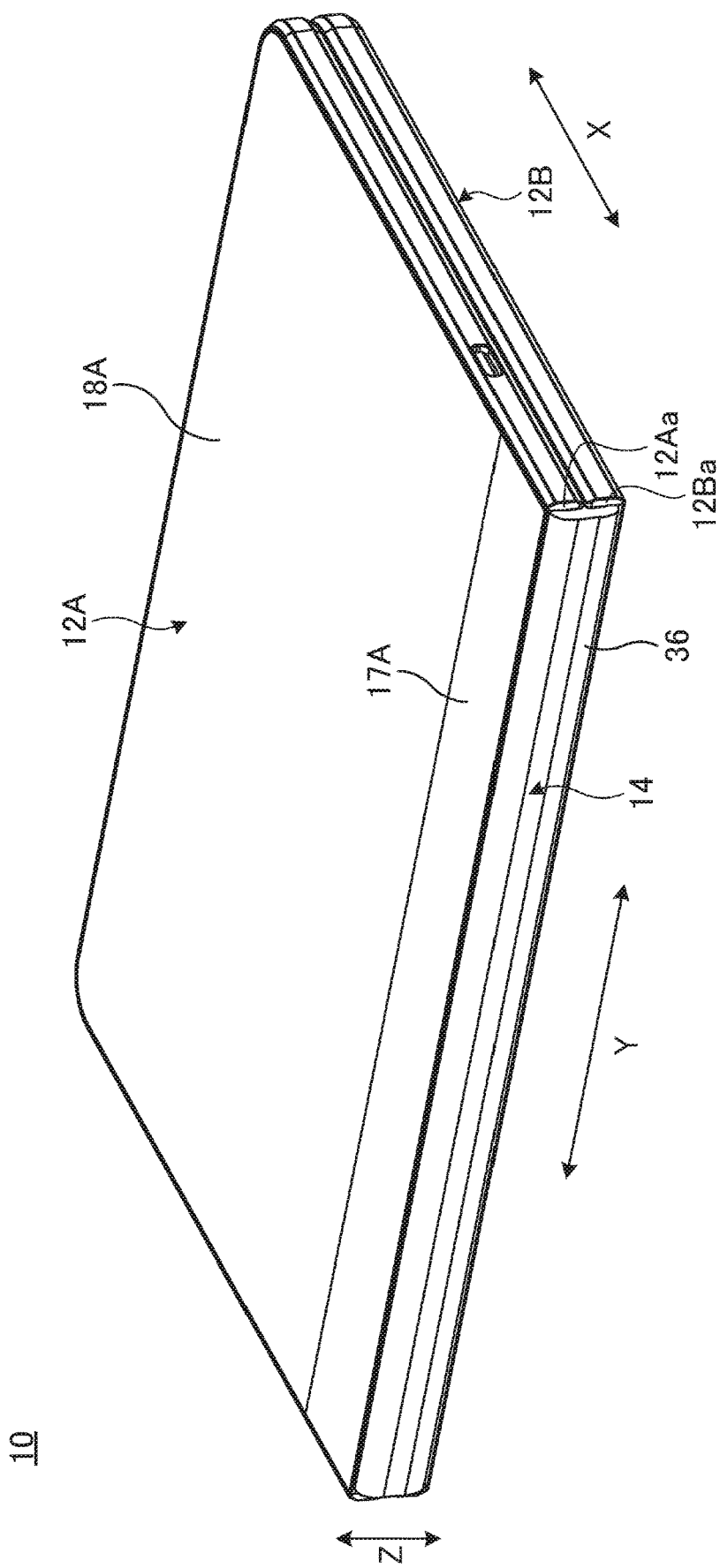
FIG. 1 is a perspective view schematically illustrating one example of a state that an electronic apparatus according to one embodiment of the present invention is closed and is brought into a 0-degree posture.
Figure 2:
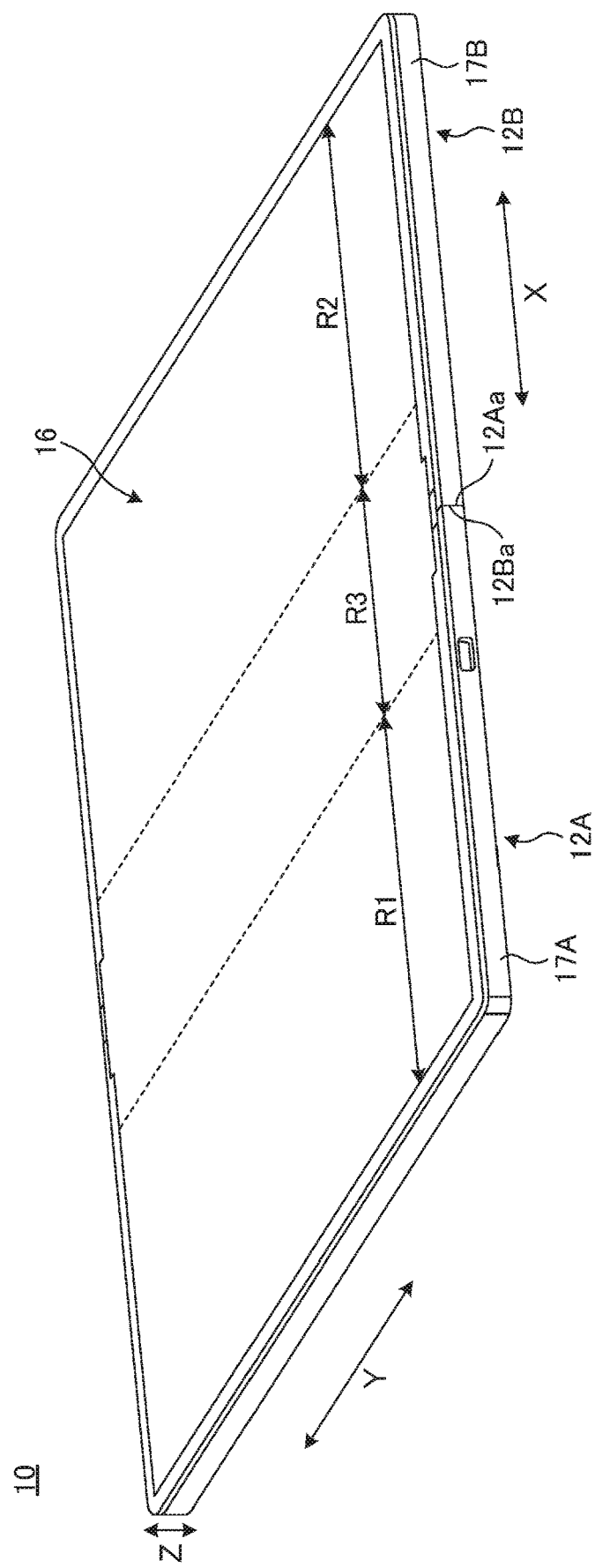
FIG. 2 is a perspective view schematically illustrating one example of a state that the electronic apparatus which is illustrated in FIG. 1 is opened and is brought into a 180-degree posture.
Figure 3:
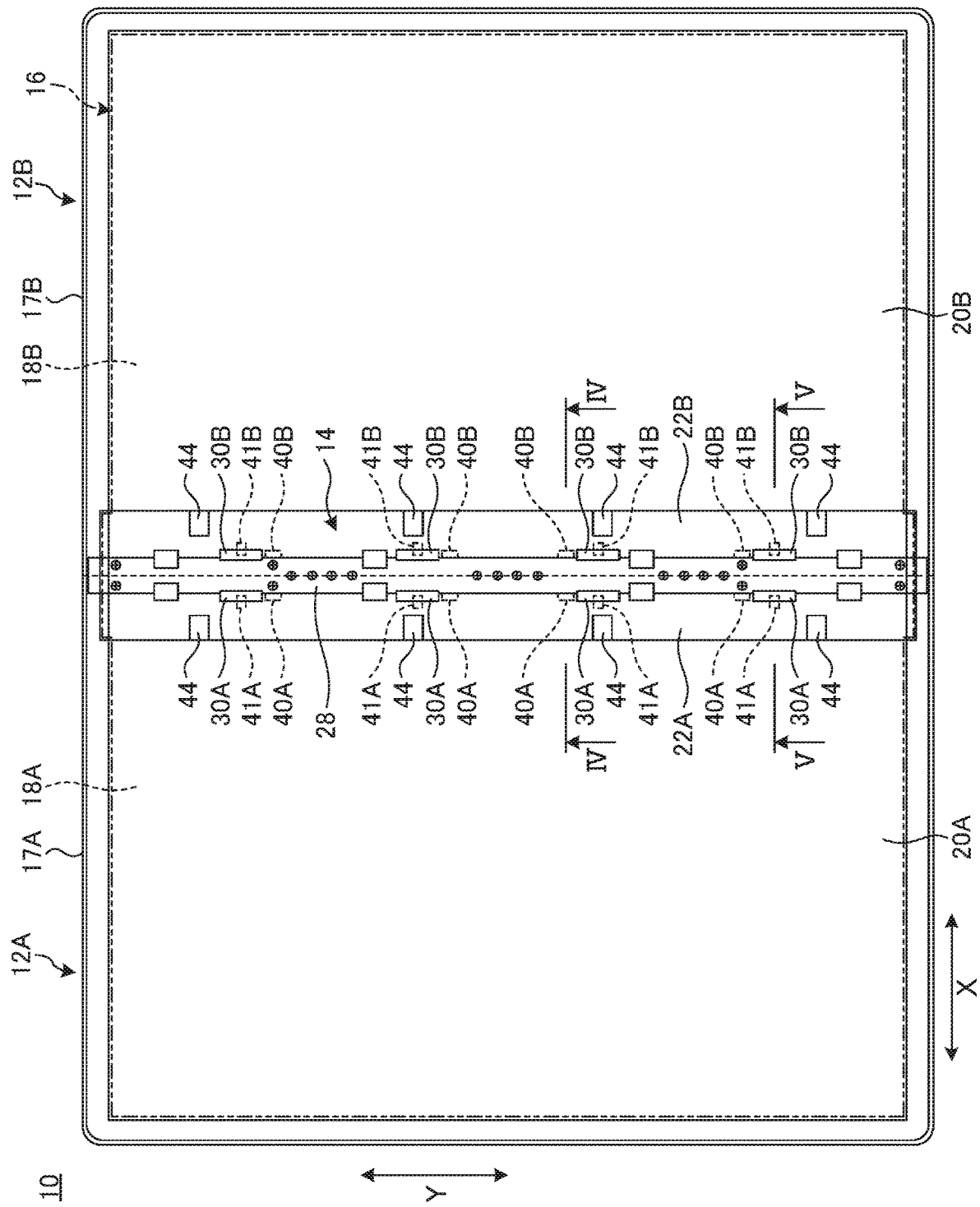
FIG. 3 is a plan view schematically illustrating one example of an internal structure of the electronic apparatus which is illustrated in FIG. 2.

FIG. 1 is a perspective view schematically illustrating one example of a state that an electronic apparatus 10 according to one embodiment of the present invention is closed and brought into the 0-degree posture. FIG. 2 is a perspective view schematically illustrating one example of a state that the electronic apparatus 10 which is illustrated in FIG. 1 is opened and brought into the 180-degree posture. FIG. 3 is a plan view schematically illustrating one example of the internal structure of the electronic apparatus 10 which is illustrated in FIG. 2.

As illustrated in FIG. 1 to FIG. 3, the electronic apparatus 10 includes a first chassis 12A and a second chassis 12B, a hinge device 14 and a display 16. The electronic apparatus 10 according to one embodiment exemplifies a tablet-type PC (Personal Computer) or a Laptop PC which is made foldable just like a book. The electronic apparatus 10 may be a smartphone, a portable gaming machine and so forth.

The respective chassis 12A and 12B are arranged in a mutually adjacent state. Each of the chassis 12A and 12B is appropriately loaded with various electronic components such as a CPU (Central Processing Unit)-implemented mother board, a battery device, an antenna module, a communication module and so forth.

The first chassis 12A includes a frame member 17A and a cover member 18A. The frame member 17A is a rectangular frame-shaped member that vertical walls are formed on three sides, other than one side that an adjacent end 12Aa which is adjacent to the second chassis 12B is formed. The cover member 18A is a plate-shaped member which closes a rear-face opening in the frame member 17A (also see FIG. 4). Likewise, the second chassis 12B includes a frame member 17B that vertical walls are formed on three sides, other than one side that an adjacent end 12Ba which is adjacent to the first chassis 12A is formed and a cover member 18B which closes a rear-face opening in the frame member 17B. Front-face openings in the frame members 17A and 17B are closed with the display 16.

Each of the members 17A, 17B, 18A and 18B is configured by a metal member which is made of, for example, stainless steel, magnesium, aluminum and so forth, a fiber-reinforced resin plate which contains reinforced fibers such as carbon fibers and other fibers and so forth.

The hinge device 14 connects the chassis 12A and 12B to be rotationally movable relative to each other between the 0-degree posture and the 180-degree posture. The hinge device 14 also functions as a back cover which hides a gap between the adjacent ends 12Aa and 12Bb which is formed at the time of taking the 0-degree posture which is illustrated in FIG. 1. The display 16 extends ranging from the chassis 12A to the chassis 12B.

In the following, the electronic apparatus 10 will be described by calling a direction that the chassis 12A and the chassis 12B are arranged side by side as an X direction, a direction which is orthogonal to the X direction and is oriented along the adjacent ends 12Aa and 12Bb of the chassis 12A and 12B as a Y direction and a thickness direction of the chassis 12A and 12B as a Z direction respectively. In addition, angular postures between the chassis 12A and 12B will be described by calling a state that the chassis 12A and 12B are folded to mutually overlap in a plane direction as the 0-degree posture (see FIG. 1) and calling a state that the chassis 12A and 12B are mutually arrayed side by side in a direction (the X direction) which is vertical to the surface normal direction as the 180-degree posture (see FIG. 2 and FIG. 3). It is possible to call each posture that the chassis 12A and 12B take between 0 degree and 180 degrees by appropriately marking each angle. For example, a state that mutual surface normal directions of the chassis 12A and 12B are orthogonal to each other exhibits a 90-degree posture. The above-described degrees of angles are picked up for the convenience of description and such a situation that in an actual product, an angular position thereof slightly deviates from an accurate angular position that an angle value indicates would naturally occur.

Figure 4:
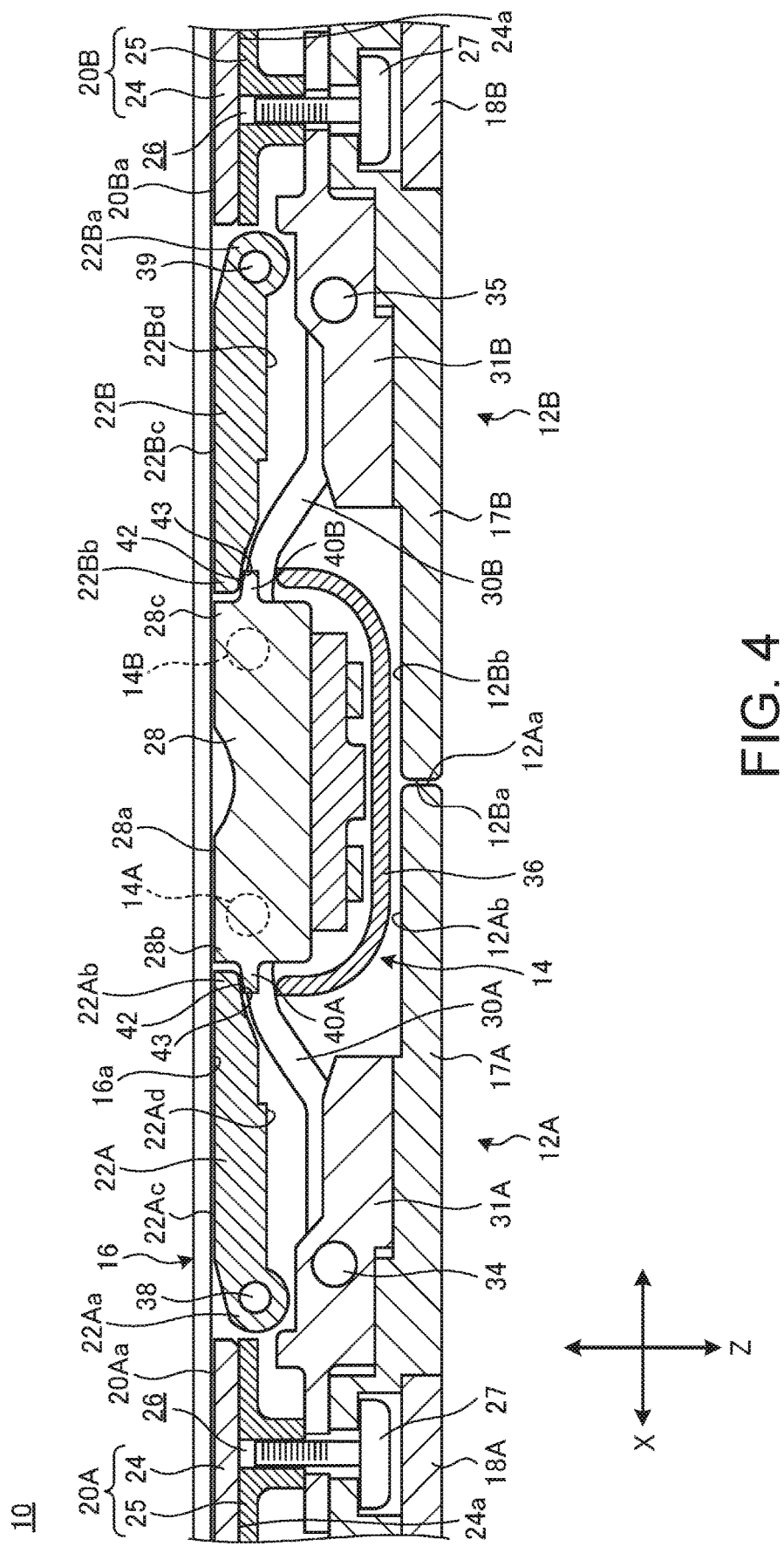
FIG. 4 is a schematic sectional diagram taken along the IV-IV line in FIG. 3.
Figure 5:
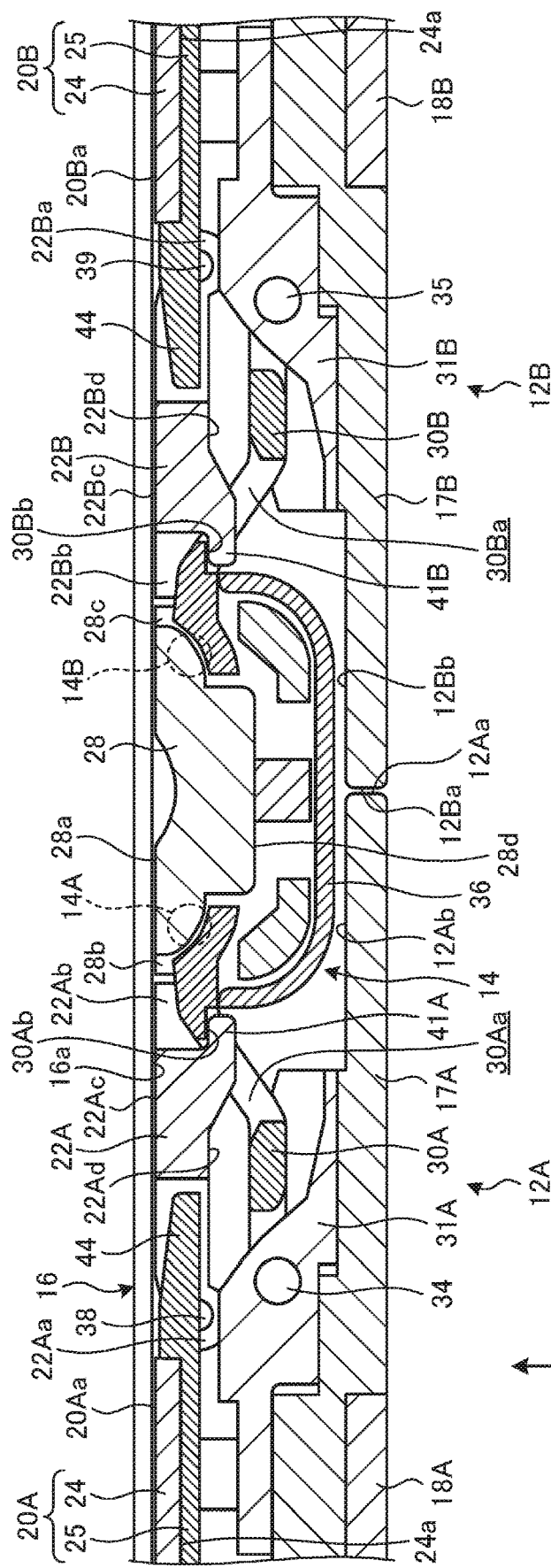
FIG. 5 is a schematic sectional diagram taken along the V-V line in FIG. 3.
Figure 6:
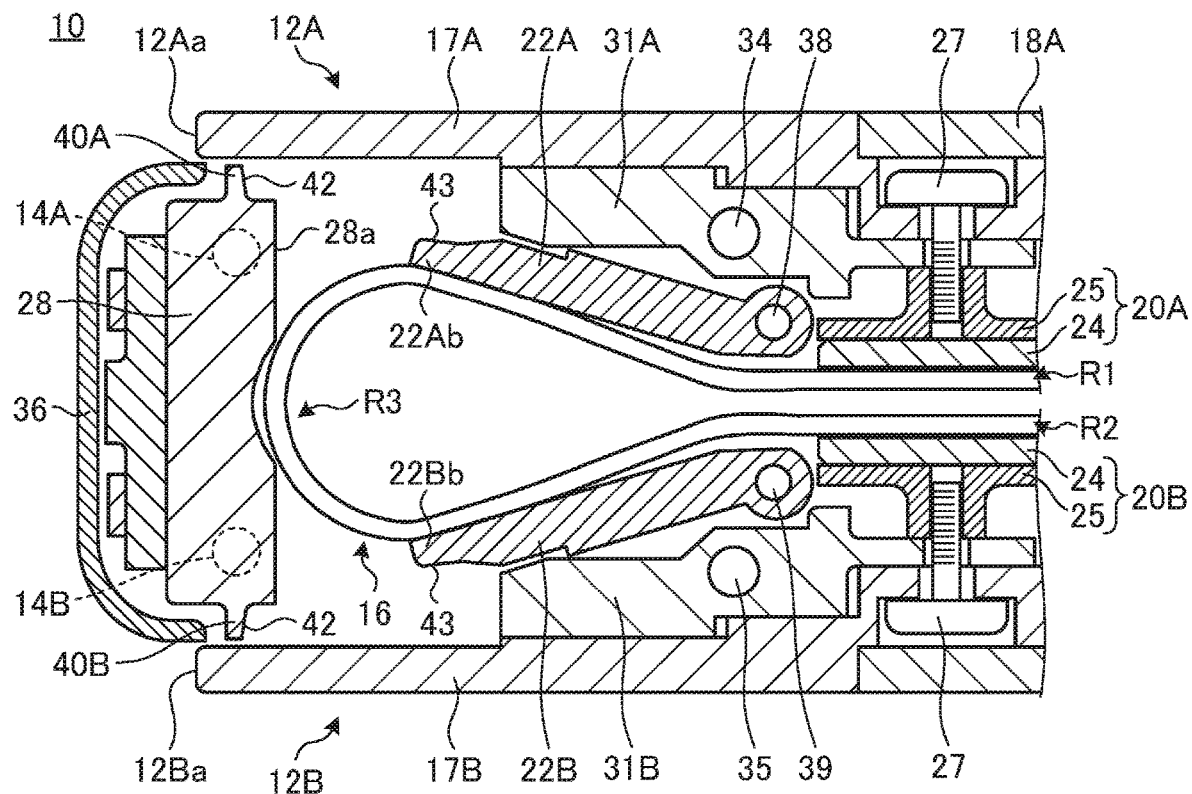
FIG. 6 is a schematic sectional diagram illustrating one example of a state that the electronic apparatus which is illustrated in FIG. 4 is brought into the 0-degree posture.

FIG. 4 is a schematic sectional diagram which is taken along the IV-IV line in FIG. 3. FIG. 5 is a schematic sectional diagram which is taken along the V-V line in FIG. 3. FIG. 6 is a schematic sectional diagram which illustrates one example of a state that the electronic apparatus 10 which is illustrated in FIG. 4 is brought into the 0-degree posture.

In the 0-degree posture which is illustrated in FIG. 1 and FIG. 6, the chassis 12A and 12B are brought into a state of being folded in two. The display 16 is a paper-like flexile display which is made of the organic EL. At the time of taking the 0-degree posture, the display 16 enters a state that a region R1 on the first chassis 12A side and a region R2 on the second chassis 12B side which are illustrated in FIG. 2 are arranged to mutually confront and a folding region R3 which is a boundary region between the regions R1 and R2 is folded in an arc. In the 180-degree posture which is illustrated in FIG. 2, the chassis 12A and the chassis 12B are mutually arranged side by side in a crosswise direction. In this case, since the regions R1 and R2 and the folding region R3 are arranged side by side on an XY plane, the display 16 exhibits a planar shape, as a whole (also see FIG. 4 and FIG. 5).

In the display 16, the region R1 is fixed relative to the first chassis 12A and the region R2 is fixed relative to the second chassis 12B. Specifically, a rear face 16a of the display 16 in the region R1 is fixed to the first chassis 12A via a first plate 20A and the rear face 16a of the display 16 in the region R2 is fixed to the second chassis 12B via a second plate 20B. The first plate 20A is adjacent to a first support plate 22A of the hinge device 14 and the second plate 20B is adjacent to a second support plate 22B of the hinge device 14 (see FIG. 3).

As illustrated in FIG. 3 to FIG. 5, the plates 20A and 20B are so arranged on the left and right sides as to sandwich the hinge device 14 and support the rear face 16a of the display 16 with their front faces 20Aa and 20Ba respectively. On the rear face 16a of the display 16, the region R1 is adhesively fixed to the front face 20Aa of the first plate 20A and the region R2 is adhesively fixed to the front face 20Ba of the second plate 20B.

Each of the plates 20A and 20B is configured by, for example, a base plate 24 and a metal frame 25. The base plate 24 is, for example, a carbon fiber reinforced resin plate that carbon fibers are impregnated with a matrix resin such as an epoxy resin and so forth. The metal frame 25 is made of, for example, a magnesium alloy and so forth and is fixed to an outer peripheral edge of a rear face 24a of the base plate 24.

Since the plates 20A and 20B are made of the carbon fiber reinforced resin, ensuring of a high flatness, thinning and right-weighting of the plates 20A and 20B are possible. However, regarding the carbon fiber reinforced resin, it is feared that the carbon fibers might fall off an outer peripheral end face (edge) as if powder is blown out and profiling, threading and so forth of the carbon fiber reinforced resin are difficult. Accordingly, each of the plates 20A and 20B is equipped with a metal frame 25 which is so installed as to surround outer edges of the outer peripheral end face thereof and the rear face 24a of the base plate 24. The plates 20A and 20B are fixed to the frame members 17A and 17B of the chassis 12A and 12B respectively by threading screws 27 into screw holes 26 which are formed in the metal frame 25. The plates 20A and 20B may be formed by using metal materials and resin materials, in place of the carbon fiber reinforced resins. In this case, installation of the metal frame 25 may be omitted.

The folding region R3 of the display 16 is made to be movable relative to the chassis 12A and 12B. At the time of taking the 180-degree posture, the rear face 16a of the display 16 in the folding region R3 is supported by the hinge main body 28 and the support plates 22A and 22B (see FIG. 4). At the time of taking the 0-degree posture, the folding region R3 is folded in the arc, a part of the rear face 16a of the display 16 is supported by the support plates 22A and 22B and most of the rear face 16a of the display 16 is separated from the hinge device 14 (see FIG. 6).

As illustrated in FIG. 3 to FIG. 5, the hinge device 14 in one embodiment of the present invention has a hinge main body 28, the first support plate 22A and the second support plate 22B.

The hinge main body 28 is installed at a position that the hinge main body 28 strides over the adjacent ends 12Aa and 12Ba of the chassis 12A and 12B and extends over the almost full length in the Y direction along the adjacent ends 12Aa and 12Ba respectively. The hinge main body 28 is a block-shaped component which is made of a metal material such as aluminum and so forth. Two hinge shafts 14A and 14B which are arrayed in the X direction in the 180-degree posture are supported to the hinge main body 28.

A first end of a first link arm 30A is supported to the first hinge shaft 14A to be rotatable axially. A first end of a second link arm 30B is supported to the second hinge shaft 14B to be rotatable axially. The link arms 30A and 30B have boomerang-like curved shapes which gradually come closer to inner faces 12Ab and 12Bb of the chassis 12A and 12B respectively toward a direction that the link arms 30A and 30B are separated from the hinge shafts 14A and 14B respectively.

A second end of the first link arm 30A is connected to a first bracket 31A to be relatively rotatable by using a rotation shaft 34. The first bracket 31A is fixed to the inner face 12Ab of the first chassis 12A by using a screw 27 and so forth. A second end of the second link arm 30B is connected to a second bracket 31B to be relatively rotatable by using a rotation shaft 35. The second bracket 31B is fixed to the inner face 12Bb of the second chassis 12B by using the screw 27 and so forth.

The link arms 30A and 30B and the brackets 31A and 31B are installed to be arrayed plurality along the Y direction which is a longitudinal direction of the hinge main body 28 (see FIG. 3). Thereby, the hinge main body 28 connects the chassis 12A and 12B to be rotationally movable relative to each other. A gear mechanism for synchronizing mutual rotational moving operations of the chassis 12A and 12B, a torque mechanism for applying a predetermined rotational movement torque to the mutual rotational moving operations of the chassis 12A and 12B and so forth are also installed in the hinge main body 28. As illustrated in FIG. 1 and FIG. 4, a back cover component 36 which functions as a decorative cover is attached to a rear face of the hinge main body 28.

At the time of taking the 180-degree posture which is illustrated in FIG. 4, the hinge main body 28 supports the rear face 16a of the display 16 in the folding region R3 with its own front face 28a. On this occasion, the hinge main body 28 is housed in the chassis 12A and 12B and is so arranged as to stride over the mutually proximate or abutting adjacent ends 12Aa and 12Ba of the chassis 12A and 12B in the X direction. At the time of taking the 0-degree posture which is illustrated in FIG. 6, the hinge main body 28 is so arranged as to fill the gap between the widely separated adjacent ends 12Aa and 12Ba and functions as the back cover of the electronic apparatus 10 which is folded just like a book. On this occasion, the back cover component 36 is exposed to an outermost face and thereby prevents external appearance designability of the folded electronic apparatus 10 from being deteriorated (see FIG. 1).

The support plates 22A and 22B are made of metal materials such as aluminum and so forth and are bisymmetric in shape. The support plates 22A and 22B are installed on the sides of the inner faces 12Ab and 12Bb of the chassis 12A and 12B respectively and extend along the adjacent ends 12Aa and 12Ba respectively over the almost full length of the electronic apparatus 10 in the Y direction.

The first support plate 22A is arranged between the first plate 20A and the hinge main body 28. In the first support plate 22A, an edge 22Aa which is located on the side of the first plate 20A is connected to the first bracket 31A to be relatively rotatable via a rotating shaft 38. In the first support plate 22A, an edge (a boundary edge 22Ab) which is located on the side of the hinge main body 28 is formed to be movable relative to the hinge main body 28.

The second support plate 22B is arranged between the second plate 20B and the hinge main body 28. In the second support plate 22B, an edge 22Ba which is located on the side of the second plate 20B is connected to the second bracket 31B to be relatively rotatable via a rotating shaft 39. In the second support plate 22B, an edge (a boundary edge 22Bb) which is located on the side of the hinge main body 28 is formed to be movable relative to the hinge main body 28.

The support plates 22A and 22B swing around the rotating shafts 38 and 39 which are set as rotation centers in accordance with the rotational moving operations of the chassis 12A and 12B respectively. At the time of taking the 180-degree posture, the support plates 22A and 22B support the rear face 16a of the display 16 in the folding region R3 with their front faces 22Ac and 22Bc respectively. At the time of taking an angular posture other than the 180-degree posture, the support plates 22A and 22B are brought into contact with the display 16 respectively in a state of leaving gaps between the display 16 and the support plate 22A and between the display 16 and the support plate 22B or by applying minute force of an extent of not inducing deformation of the display 16 (see FIG. 6). The support plates 22A and 22B may be also configured to support the folding region R3 of the display 16 also in an angular posture other than the 180-degree posture and to correct the shape of the folding region R3 respectively. The support plates 22A and 22B stably support the folding region R3 of the display 16 planarly in this way at the time of taking the 180-degree posture and, in addition, do not hinder the folding operation of the folding region R3 respectively.

At the time of taking the 180-degree posture which is illustrated in FIG. 4 and FIG. 5, it is desirable for edges of the plates 20A and 20B which are located on the sides of the support plates 22A and 22B respectively and the edges 22Aa and 22Ba of the support plates 22A and 22B to form one plane with no level difference. Likewise, it is also desirable to form one plane with no level difference between the boundary edge 22Ab of the support plate 22A and an edge 28b of the hinge main body 28 and between the boundary edge 22Bb of the support plate 22B and an edge 28c of the hinge main body 28 respectively.

In a case where the positions of the above-described respective edges deviate from one another in the Z direction and the level difference occurs between the front faces 20Aa and 22Ac, between the front faces 22Ac and 28a, between the front faces 28a and 22Bc or between the front faces 22Bc and 20Ba, the level difference affects the display 16. Then, at the time of taking the 180-degree posture, the display 16 is curved or waves and product defects such as visual confirmation defects, display defects and so forth would possibly occur. In addition, in a case where the display 16 is curved or waves, the display 16 would not possibly work on an opening/closing track in design in opening and closing operations which are performed between the 180-degree posture and the 0-degree posture. Consequently, it is also feared that an excessive load would be exerted particularly on the folding region R3 and its vicinity and thereby the display 16 would be damaged or would malfunction.

However, in the support plates 22A and 22B, the edge 22Aa which is located on the side of the plate 20A and the edge 22Ba which is located on the side of the plate 20B side are connected to the brackets 31A and 31B via the rotating shafts 38 and 39 respectively. Then, the brackets 31A and 31B are fixed to the chassis 12A and 12B respectively. Accordingly, the position of the first support plate 22A relative to the first chassis 12A is fixed and, also the first plate 20A is fixed to the first chassis 12A. Likewise, the position of the second support plate 22B relative to the second chassis 12B is fixed and, also the second plate 20B is fixed to the second chassis 12B. Accordingly, level differences other than a manufacturing tolerance do not occur between the front faces 20Aa and 22Ac and between the front faces 20Ba and 22Bc and any level difference is not formed substantially.

Accordingly, the electronic apparatus 10 according to one embodiment of the present invention includes constitutional elements for suppressing the level differences between the front face 22Ac of the support plate 22A and the front face 28a of the hinge main body 28 and between the front face 22Bc of the support plate 22B and the front face 28a of the hinge main body 28. Specifically, the electronic apparatus 10 includes a first locking strip 40A, a second locking strip 40B, a first plate-side locking strip 41A and a second plate-side locking strip 41B.

As illustrated in FIG. 4, the first locking strip 40A of the hinge main body 28 is a claw-shaped member which is formed on the edge 28b which is located on the side of the first support plate 22A. The first locking strip 40A protrudes toward the side of the first support plate 22A beyond a boundary line between the hinge main body 28 and the first support plate 22A. The front face of the first locking strip 40A is locked to the rear face of the first support plate 22A at the time of taking the 180-degree posture. On this occasion, the boundary edge 22Ab of the first support plate 22A is so arranged as to be sandwiched between the first locking strip 40A and the display 16.

The second locking strip 40B is a claw-shaped member which is formed on the edge 28c of the hinge main body 28 which is located on the side of the second support plate 22B. The second locking strip 40B protrudes toward the side of the second support plate 22B beyond a boundary line between the hinge main body 28 and the second support plate 22B. The front face of the second locking strip 40B is locked to the rear face of the second support plate 22B at the time of taking the 180-degree posture. On this occasion, the boundary edge 22Bb of the second support plate 22B is so arranged as to be sandwiched between the second locking strip 40B and the display 16.

A protrusion length of each of the locking strips 40A and 40B is, for example, about 2 mm. Tapered faces 42 are formed on the front faces of the locking strips 40A and 40B, that is, the faces which abut on the support plates 22A and 22B respectively. In addition, also tapered faces 43 are formed on rear faces 22Ad and 22Bb of the boundary edges 22Ab and 22Bb of the support plates 22A and 22B respectively at positions that the tapered faces 42 abut.

The tapered faces 42 are inclined faces which incline in a downward direction that the tapered faces 42 gradually separate from the front face 28a of the hinge main body 28 toward protrusion tips of the locking strips 40A and 40B respectively. The tapered faces 43 are inclined faces which incline in a downward direction that the tapered faces 43 gradually separate from the front faces 22Ac and 22Bc of the support plates 22A and 22B toward directions that the locking strips 40A and 40B protrude respectively. Thereby, in a case where the support plates 22A and 22B relatively move while rotating relative to the hinge main body 28 at the time that the chassis 12A and 12B mutually perform rotational moving operations, that the locking strips 40A and 40B get caught on the support plates 22A and 22B respectively is suppressed and smooth swinging operations of the support plates 22A and 22B are secured.

In FIG. 3 and FIG. 5, a reference numeral 44 denotes slope members which protrude from edges of the support plates 20A and 20B which are located on the sides of the support plate 22A and the support plate 22B respectively. The slope members 44 are installed in such a manner that a plurality (for example, four) of the slope members 44 is arrayed along the edges 22Aa and 22Ba respectively. The slope members 44 are adapted to support sliding to the rear face 16a of the display 16 at the time of performing the mutual rotational operations for shifting from the 180-degree posture to the 0-degree posture thereby to correct the shape of the folding region R3 to an appropriate shape (a linear shape, a curved shape and so forth) which accords with a rotational movement angle. Recessed escaping parts for avoiding interference of the slope member 44 at the time of taking the 180-degree posture are formed in the boundary edges 22Ab and 22Bb of the support plates 22A and 22B respectively.

As illustrated in FIG. 5, the first plate-side locking strip 41A is a claw-shaped member which is formed on the rear face 22Ad of the boundary edge 22Ab of the first support plate 22A. The first plate-side locking strip 41A has, for example, a hook shape in section and protrudes toward the side of the hinge main body 28 beyond a boundary line between the first support plate 22A and the hinge main body 28. The first plate-side locking strip 41A is locked on the rear face side of the hinge main body 28 at the time of taking the 180-degree posture.

The first plate-side locking strip 41A in one embodiment of the present invention enters an X-direction slot 30Aa which is formed in a first link arm 30A and is locked to a rear face 30Ab of the first link arm 30A. That is, the first link arm 30A is so connected to the hinge main body 28 as to be relatively rotatable via the first hinge shaft 14A and movement of the first link arm 30A is restrained at a position that the first link arm 30A rotates the most in a clockwise direction in FIG. 5 at the time of taking the 180-degree posture. Accordingly, the first plate-side locking strip 41A is relatively locked on the side of a rear face 28d of the hinge main body 28 by being locked to the first link arm 30A and further upward movement of the first plate-side locking strip 41A is restrained.

As illustrated in FIG. 5, the second plate-side locking strip 41B is a claw-shaped member which is formed on the rear face 22Bd of the boundary edge 22Bb of the second support plate 22B. The second plate-side locking strip 41B has, for example, a hook shape in section and protrudes toward the side of the hinge main body 28 beyond a boundary line between the second support plate 22B and the hinge main body 28. The second plate-side locking strip 41B is locked on the side of the rear face 28d of the hinge main body 28 at the time of taking the 180-degree posture.

The second plate-side locking strip 41B in one embodiment of the present invention also enters an X-direction slot 30Ba which is formed in a second link arm 30B and is locked to a rear face 30Bb of the second link arm 30B. That is, the second link arm 30B is connected to the hinge main body 28 to be relatively rotatable via the second hinge shaft 14B and movement of the second link arm 30B is restrained at a position that the second link arm 30B rotates the most in a counter-clockwise direction in FIG. 5 at the time of taking the 180-degree posture. Accordingly, the second plate-side locking strip 41B is relatively locked on the side of the rear face side 28d of the hinge main body 28 by being locked to the second link arm 30B and further upward movement of the second plate side locking strip 41B is restrained.

A protrusion length of each of the plate-side locking strips 41A and 41B is, for example, about 2 mm. Incidentally, the front faces of the plate-side locking strips 41A and 41B may be made flat with no formation of such tapered faces as those on the locking strips 40A and 40B. The reason therefore lies in the point that at the time that the chassis 12A and 12B mutually perform the rotational moving operations, the plate-side locking 41A and 41B simply move in directions that the plate-side locking strips 41A and 41B come into contact with the rear faces 30Ab and 30Bb and separate from the rear faces 30Ab and 30Bb respectively and complicated relative rotation and relative movement that the support plates 22A and 22B perform relative to the hinge main body 28 are not performed.

Figure 7:
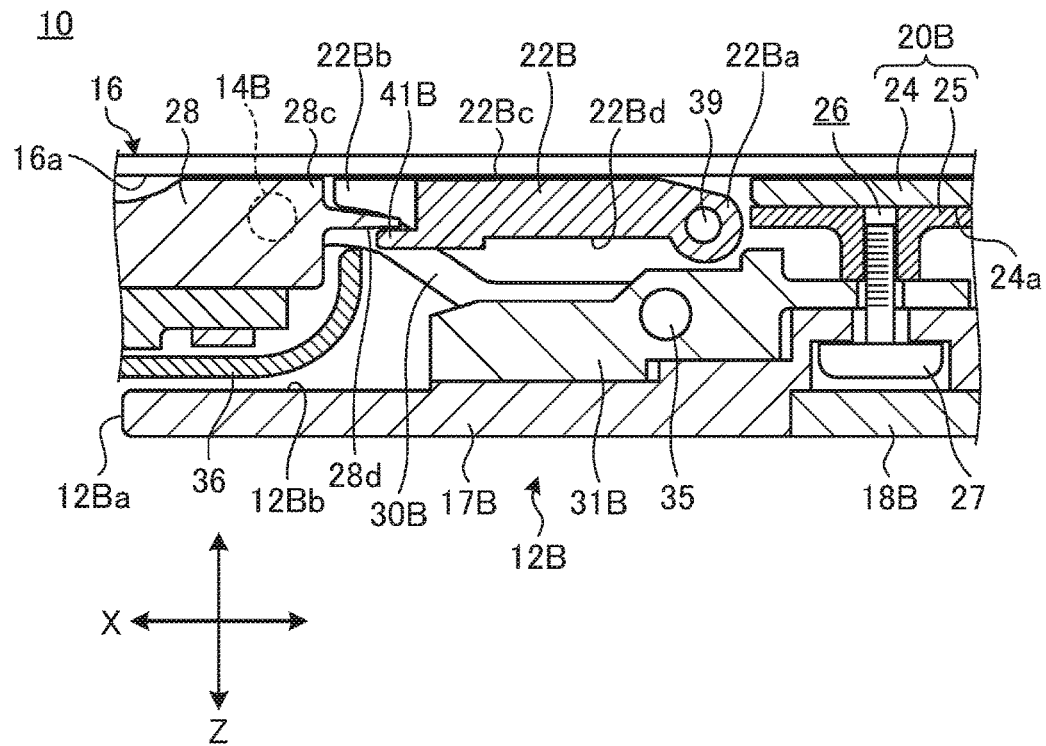
FIG. 7 is a schematic side sectional diagram illustrating one configuration example that a plate-side locking strip is directly locked with a hinge main body.

As illustrated in FIG. 7, the plate-side locking strips 41A and 41B may be structured to be directly locked on the side of the rear face 28d of the hinge main body 28 instead of being locked via the link arms 30A and 30B respectively.

Incidentally, although in FIG. 7, only the second plate-side locking strip 41B and peripheral parts thereof are illustrated, also the first plate-side locking strip 41A and peripheral parts thereof may be structured to be laterally symmetric to the structure which is illustrated in FIG. 7.

As illustrated in FIG. 3, the first locking strip 40A and the first plate-side locking strip 41A are so arranged as to alternate with each other in the Y direction. Likewise, the second locking strip 40B and the second plate-side locking strip 41B are so arranged as to alternate with each other in the Y direction. Further, in one embodiment of the present invention, a set of the locking strips 40A and 40B and the plate-side locking strips 41A and 41B is installed such that a plurality of sets, for example, four sets of the locking strips 40A and 40B and the plate-side locking strips 41A and 41B are arrayed side by side along the Y direction respectively.

Next, the rotational moving operations of the chassis 12A and 12B and operational effects which are obtained in a case where the chassis 12A and 12B are rotationally moved will be described.

First, at the time of taking the 0-degree posture which is illustrated in FIG. 6, the chassis 12A and 12B exhibit a highly designable folded state that the chassis 12A and 12B are folded, with surface normal directions thereof being almost in parallel with each other. In this state, the display 16 exhibits a bell shape that the folding region R3 is curved with a desirable curvature. That is, in the display 16, the folding region R3 is folded to the desired bell shape by the plates 20A and 20B which are folded in parallel with each other via a predetermined gap. As a result, in the electronic apparatus 10, the chassis 12A and 12B are thinned to the greatest possible extent and, in addition, also breakage of the display 16 which would occur at the time of folding the display 16 is suppressed.

Next, a case where the chassis 12A and 12B are mutually rotationally moved from the 0-degree posture toward the 180-degree posture will be described. As illustrated in FIG. 4 to FIG. 6, in this case, the support plates 22A and 22B move relative to the hinge main body 28 while swinging around the rotating shafts 38 and 39 respectively in association with mutual opening operations of the chassis 12A and 12B. The folded state of the folding region R3 of the display 16 is gradually released with the aid of the plates 20A and 20B which operate integrally with the chassis 12A and 12B respectively.

Then, in the 180-degree posture which is illustrated in FIG. 4 and FIG. 5, the plates 20A and 20B, the hinge main body 28 and the support plates 22A and 22B lie on the same X-Y plane respectively. The front faces 20Aa and 20Ba of the plates 20A and 20B, the front face 28a of the hinge main body 28 and the front faces 22Ac and 22Bc of the support plates 22A and 22B are arranged to be almost flush with one another and as a whole form one flat plate. The entire of the rear face 16a of the display 16 is supported on the flat plate and the display 16 forms one plate-shaped large screen (also see FIG. 2).

Next, a case where the chassis 12A and 12B are mutually moved rotationally from the 180-degree posture toward the 0-degree posture will be described. In this case, in association with mutual closing operations of the chassis 12A and 12B, the support plates 22A and 22B again swing and move relative to the hinge main body 28. The display 16 receives folding force which is exerted from the plates 20A and 20B which operate integrally with the chassis 22A and 22B respectively and the folding region R3 is gradually folded. As a result, the folding region R3 exhibits again the almost bell shape in the 0-degree posture which is illustrated in FIG. 6.

In association with such rotational moving operations as above, in the 180-degree posture which is illustrated in FIG. 4, the locking strips 40A and 40B are locked to the rear faces 22Ad and 22Bd of the support plates 22A and 22B respectively. Further, as illustrated in FIG. 5, the plate-side locking strips 41A and 41B are indirectly locked to the rear face 28d of the hinge main body 28 via the link arms 30A and 30B respectively. Incidentally, at the time of taking the 0-degree posture which is illustrated in FIG. 6, the locking strips 40A and 40B are released from the support plates 22A and 22B respectively and also the plate-side locking strips 41A and 41B are released from the link arms 30A and 30B respectively.

In a case where the chassis 12A and 12B are mutually operated from the 0-degree posture to the 180-degree posture in this way, the respective locking strips 40A and 40B are locked to their confronting support plates 22A and 22B and push the rear faces 22Ad and 22Bd of the support plates 22A and 22B upward respectively. Likewise, the plate-side locking strips 41A and 41B which are arranged alternately with the respective locking strips 40A and 40B are locked to their confronting link arms 30A and 30B which are connected to the hinge main body 28 respectively and push the hinge main body 28 upward.

Thereby, at a boundary part between the hinge main body 28 and the first support plate 22A, force that the first locking strip 40A pushes the first support plate 22A upward and force that the first plate-side locking strip 41A pushes the first link arm 30A and the hinge main body 28 upward regulate mutually. As a result, in the hinge main body 28 and the first support plate 22A, their edges 28b and 22Ab induce no level difference in the Z direction and their front faces 28a and 22Ac are arranged on the same plane and thereby the main hinge body 28 and the first support plate 22A are stabilized.

Likewise, also at a boundary part between the hinge main body 28 and the second support plate 22B, force that the second locking strip 40b pushes the second support plate 22B upward and force that the second plate-side locking strip 41B pushes the second link arm 3B and the hinge main body 28 upward regulate each other. As a result, in the hinge main body 28 and the second support plate 22B, their edges 28c and 22Bb induce no level difference in the Z direction and their front faces 28a and 22Bc are arranged on the same plane and thereby the hinge main body 28 and the second support plate 22B are stabilized.

Incidentally, as described above, since the mutual relative positions of the support plates 22A and 22B and the plates 20A and 20B are fixed, no level difference occurs between/ among these plates.

Accordingly, in the electronic apparatus 10, in the 180-degree posture, the front faces 20Aa, 20Ba, 28a, 22Ac, 22Bc which support the display 16 stably form one plane. Therefore, it becomes possible for the electronic apparatus 10 to stably support the display 16 at the time of taking the 180-degree posture and to suppress occurrence of deformation, defects in good and so forth of the display 16.

In the electronic apparatus 10, at the time of taking the 180-degree posture, the boundary edge 22Ab of the first support plate 22A is so arranged as to be sandwiched between the first locking strip 40A and the display 16. In addition, also the boundary edge 22Bb of the second support plate 22B is so arranged as to be sandwiched between the second locking strip 40B and the display 16. Accordingly, as illustrated in FIG. 4, although the electronic apparatus 10 has a configuration that the locking strips 40A and 40B are installed, it becomes possible to secure smooth operations of the support plates 22A and 22B and a high flatness of the front faces 28a, 22Ac and 22Bc simply by securing small gaps between the front face 28a and the front face 22Ac and between the front face 28a and the front face 22Bc.

In the electronic apparatus 10, the plate-side locking strips 41A and 41B abut on the link arms 30A and 30B respectively at the time of taking the 180-degree posture and thereby are locked to the hinge main body 28 relatively. Thereby, it becomes possible for the electronic apparatus 10 to make the link arms 30A and 30B surely rotationally move to appropriate positions relative to the hinge main body 28 and to press the link arms 30A and 30B against the hinge main body 28 with the aid of the plate-side locking strips 41A and 41B. As a result, in a case where the electronic apparatus 10 is used in the 180-degree posture, it becomes possible to suppress occurrence of backlash between the hinge main body 28 and the link arm 30A and between the hinge main body 28 and the link arm 30B.

In the electronic apparatus 10, the plurality of sets of the locking strips 40A and 40B and the plate-side locking strips 41A and 41B which are alternately arranged is provided to be arrayed along the Y direction respectively. Accordingly, it becomes possible to suppress occurrence of the level differences between the hinge main body 28 and the support plate 22A and between the hinge main body 28 and the support plate 22B longitudinally. Incidentally, in regard to the number of sets of the first locking strip 40A and the first plate-side locking strip 41A and the number of sets of the second locking strip 40B and the second plate-side locking strip 41B, at least each one set may be prepared.

Incidentally, the present invention is not limited to the above-described embodiment and it goes without saying that it is possible to freely change the configuration within a range not deviating from the gist of the present invention.

Although, in the above description, the electronic apparatus 10 which is foldable in half just like the book is exemplified, the present invention is also applicable to various configurations such as, for example, an outward-opening type configuration that a small chassis is so connected to each of left and right edges of a large chassis as to be foldable, an S-type folding configuration that chassis which are different in folding direction are connected to right and left edges of one chassis, a J-type folding configuration that a small chassis is so connected to one of left and right edges of a large chassis as to be foldable and so forth and the number of the chassis to be connected may be set to four or more.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10: electronic apparatus
12A: first chassis
12B: second chassis
14: hinge device
16: display
20A: first plate
20B: second plate
22A: first support plate
22B: second support plate
28: hinge main body
30A: first link arm
30B: second link arm
31A: first bracket
31B: second bracket
40A: first locking strip
40B: second locking strip
41A: first plate-side locking strip
41B: second plate-side locking strip

What is claimed is:
1. An electronic apparatus comprising:
a first chassis;
a second chassis which is adjacent to the first chassis;
a hinge device which so connects the first chassis and the second chassis as to be rotationally movable relative to each other between a first posture that the first chassis and the second chassis are so folded as to mutually overlap in a surface normal direction and a second posture that the first chassis and the second chassis are mutually arrayed in a direction which is vertical to the surface normal direction; and
a display which is so installed as to range from the first chassis to the second chassis and has a folding region which is folded in accordance with relative rotational movement of the first chassis and the second chassis, wherein
the hinge device has
a hinge main body which extends along mutually adjacent ends of the first chassis and the second chassis, is so arranged as to stride over the mutually adjacent ends and supports a rear face of the display with its front face,
a first support plate which is adjacent to a first edge of the hinge main body which is located on the first chassis side, is installed to be movable relative to the first edge and supports the rear face of the display with its front face and
a second support plate which is adjacent to a second edge of the hinge main body which is located on the second chassis side, is installed to be movable relative to the second edge and supports the rear face of the display with its front face, the hinge main body has
a first locking strip which protrudes toward the first support plate side and is locked on the rear face side of the first support plate at the time of taking the second posture and
a second locking strip which protrudes toward the second support plate side and is locked on the rear face side of the second support plate at the time of taking the second posture, the first support plate has a first plate-side locking strip which protrudes toward the hinge main body side and is locked on the rear face side of the hinge main body at the time of taking the second posture, and the second support plate has a second plate-side locking strip which protrudes toward the hinge main body side and is locked on the rear face side of the hinge main body at the time of taking the second posture.

2. The electronic apparatus according to claim 1, further comprising:
a first plate which is fixed to the first chassis, is adjacent to an edge of the first support plate which is located on the side which is opposite to the hinge main body side and thereby supports the rear face of the display with its front face; and
a second plate which is fixed to the second chassis, is adjacent to an edge of the second support plate which is located on the side which is opposite to the hinge main body side and thereby supports the rear face of the display with its front face, wherein
in the first support plate, an edge which is located on the first plate side is supported to be rotatable relative to the first chassis and thereby a position of the edge relative to the first plate is fixed and
in the second support plate, an edge which is located on the first plate side is supported to be rotatable relative to the second chassis and thereby a position of the edge relative to the second plate is fixed.

3. The electronic apparatus according to claim 1, wherein
an edge of the first support plate which is located on the hinge main body side is arranged to be sandwiched between the first locking strip and the display at the time of taking the second posture and
an edge of the second support plate which is located on the hinge main body side is arranged to be sandwiched between the second locking strip and the display at the time of taking the second posture.

4. The electronic apparatus according to claim 3, wherein
the first locking strip and the first support plate have tapered faces which incline in a direction that the first locking strip and the first support plate separate from a front face of the hinge main body toward a direction that the first locking strip protrudes on their respective faces to be mutually locked and
the second locking strip and the second support plate have tapered faces which incline in a direction that the second locking strip and the second support plate separate from the front face of the hinge main body toward a direction that the second locking strip protrudes on their respective faces to be mutually locked.

5. The electronic apparatus according to claim 1, wherein
the hinge device further has
a first bracket which is fixed to the first chassis,
a second bracket which is fixed to the second chassis,
a first link arm that a first end is supported to the hinge main body to be relatively rotatable and a second end is supported to the first bracket to be relatively rotatable and
a second link arm that a first end is supported to the hinge main body to be relatively rotatable and a second end is supported to the second bracket to be relatively rotatable,
the first plate-side locking strip abuts on the first link arm at the time of taking the second posture and is thereby locked to the hinge main body relatively, and
the second plate-side locking strip abuts on the second link arm at the time of taking the second posture and is thereby locked to the hinge main body relatively.

6. The electronic apparatus according to claim 1, wherein
a plurality of sets in each of which the first locking strips and the first plate-side locking strips are alternately arranged in a longitudinal direction of their mutually adjacent ends is installed along the longitudinal direction of the mutually adjacent ends and
a plurality of sets in each of which the second locking strips and the second plate-side locking strips are alternately arranged in a longitudinal direction of their mutually adjacent ends is installed along the longitudinal direction of the mutually adjacent ends.

* * * * *